M. WILLIAMS.
Horse-Power Chain.
No. 199,769. Patented Jan. 29, 1878.
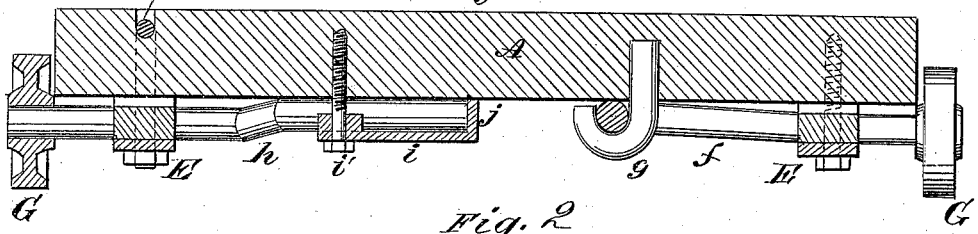
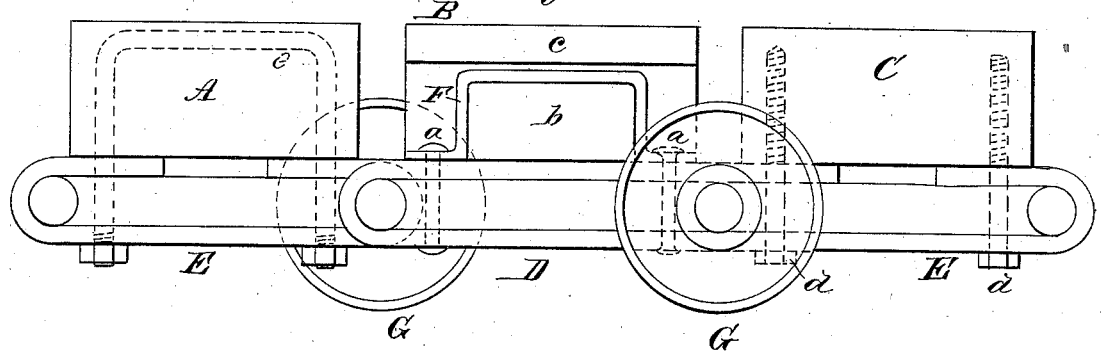
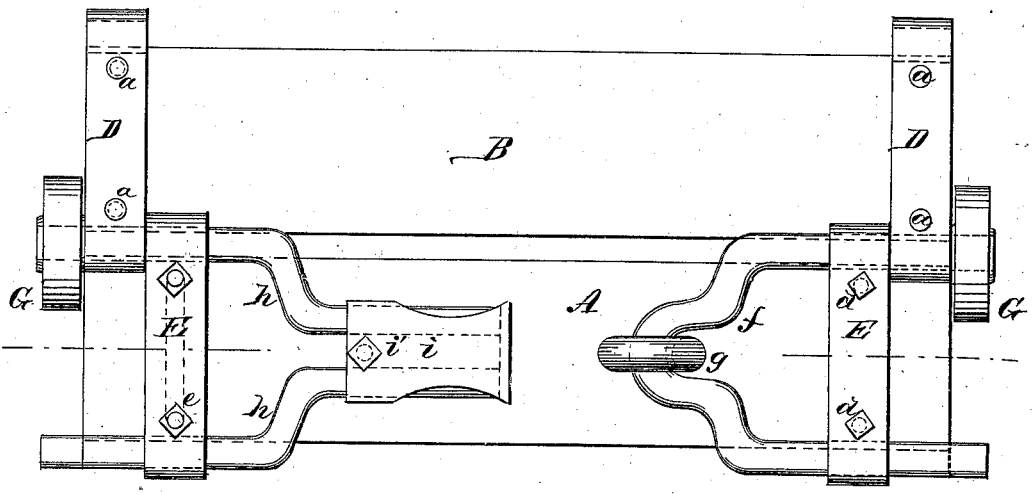
WITNESSES:
C. Neveux
J. H. Scarborough
INVENTOR:
M. Williams
BY Munn & Co
ATTORNEYS.

UNITED STATES PATENT OFFICE.

MARTIN WILLIAMS, OF ST. JOHNSVILLE, NEW YORK.

IMPROVEMENT IN HORSE-POWER CHAINS.

Specification forming part of Letters Patent No. 199,769, dated January 29, 1878; application filed November 30, 1877.

*To all whom it may concern:*

Be it known that I, MARTIN WILLIAMS, of St. Johnsville, in the county of Montgomery and State of New York, have invented a new and Improved Railway Horse-Power Chain, of which the following is a specification:

Figure 1 is a longitudinal section of one of the tread-planks. Fig. 2 is a side elevation of a portion of a chain or apron constructed on my improved plan. Fig. 3 is an inverted plan view of a portion of the horse-power chain or apron.

Similar letters of reference indicate corresponding parts.

My invention relates to the construction of a chain or endless apron for tread horse-powers; and it consists in a novel arrangement of the rods upon which the track-rolls turn, and in a connecting-link of peculiar construction; also, in a fastening for securing the tread-plank to the links of the chain.

Referring to the drawings, A, B, and C are tread-planks, which are attached to a chain consisting of links D E. The link D is formed of band-iron, and has parallel sides and semicircular ends, for receiving the rods by which the links are jointed together. The ends of the band-iron from which the link is formed are united by welding, and the space between the parallel sides of the link is filled with a block of wood or other suitable material, having in its ends semicircular notches, that form, together with the semicircular ends of the link, a circular aperture for receiving the joint-rod. A clip, F, is secured in one of the flat sides of the link D by rivets $a$, for receiving a tenon, $b$, formed on the end of the tread-plank B. This tenon is formed on the end of the tread-plank so as to leave the portion $c$ projecting over the clip F.

The links E, that are secured to the tread-plank A C, are formed of band-iron, and have the same shape and are filled in the same manner as the link D, already described; but the ends of the band-iron are not welded together. These links are attached to the tread-plank, either by bolts $d$ or by the rod $e$, that is bent twice at right angles, and threaded at its ends, and passed through both the tread-plank and the links, and secured by nuts. A gain is cut in the upper surface of the tread-plank to receive the middle portion of the rod $e$. The rods upon which the track-rollers run are arranged in two ways.

The rod $f$ is bent into a U form, with a curve of small radius in the middle for receiving a staple or hook, $g$. The ends of this rod extend through the circular openings formed at the ends of the links D E, forming the pivots on which the links move and project sufficiently to receive the track-rollers G.

The rods $h$ are offset, so as to bring their inner ends near the center of the tread-plank, where they are fastened by a clamp, $i$, which is provided with semicircular notches for embracing the side of the rods, and has a lip, $j$, which is turned at right angles toward the tread-plank, to prevent the rods from being moved inward. The clamp $i$ is secured to the tread-plank by a bolt, $i'$. The rods $h$ extend through the links, as in the case before described, and upon these outer ends the track-rollers G are placed. These rods, when worn upon one end, may be reversed.

It is obvious that the links, the clips, and the rods may be made of malleable iron instead of wrought-iron, as described.

The chain herein described possesses many advantages over those in common use, among which are its lightness, its strength, and the facility with which it may be repaired.

Having thus described my invention, I claim as new and desire to secure by Letters Patent—

1. The link D, made as described, and having secured to it the clip F, in combination with the tread-plank B, having the tenon $b$, substantially as herein specified.

2. The link-fastening consisting of the threaded rod $e$, bent twice at right angles, in combination with the tread-plank A, substantially as specified.

3. The combination of the U-shaped rod $f$ with the links D E, as herein shown and described.

4. The reversible rods $h$ and the clamp $i$, in combination with the links of a horse-power chain, substantially as shown and described.

MARTIN WILLIAMS.

Witnesses:
HENRY SPRINGSTED,
MARTIN WALRATH, Jr.